United States Patent [19]

Takahashi et al.

[11] Patent Number: 4,927,587

[45] Date of Patent: May 22, 1990

[54] METHOD FOR MANUFACTURING EXTRUSION MOLDED SILICONE INSULATING ARTICLES

[75] Inventors: Masaharu Takahashi; Takeo Yoshida, both of Annaka, Japan

[73] Assignee: Shin-Etsu Chemical Co., Ltd., Tokyo, Japan

[21] Appl. No.: 316,959

[22] Filed: Feb. 28, 1989

[30] Foreign Application Priority Data

Feb. 29, 1988 [JP] Japan .................................. 63-46049

[51] Int. Cl.$^5$ ...................... B29C 47/00; B29C 47/06; B32B 1/08; C08K 3/38
[52] U.S. Cl. .................................. 264/211; 264/174; 264/236; 524/404; 524/492; 524/588; 524/860; 528/13; 528/24; 528/32; 528/33; 528/34
[58] Field of Search ............... 264/174, 211, 236, 347; 524/404, 492, 588, 860; 528/13, 24, 32, 33, 34; 174/110 S

[56] References Cited

U.S. PATENT DOCUMENTS

| | | | |
|---|---|---|---|
| 3,050,490 | 8/1962 | Nitzsche et al. | 524/404 |
| 3,518,222 | 6/1970 | Ostrowski | 524/404 |
| 4,292,225 | 9/1981 | Theodore et al. | 524/404 X |

FOREIGN PATENT DOCUMENTS

| | | | |
|---|---|---|---|
| 54-61253 | 5/1979 | Japan | 524/404 |
| 55-166807 | 12/1980 | Japan | 264/236 |
| 58-201846 | 11/1983 | Japan | 524/404 |
| 61-49823 | 3/1986 | Japan | 264/211 |
| 62-154410 | 7/1987 | Japan | 524/404 |

*Primary Examiner*—Jeffery Thurlow
*Assistant Examiner*—Leo B. Tentoni
*Attorney, Agent, or Firm*—Birch, Stewart, Kolasch & Birch

[57] ABSTRACT

An extrusion molding silicon rubber composition including (A) 100 pbw of an organopolysiloxane, (B) 5-500 pbw of finely divided silica filler, (C) 1-50 pbw of powder boron nitride having a mean particle size of up to 20 μm, and (D) a curing catalyst is extrusion molded and cured into an insulating article which has improved physical properties and dielectric strength and is thus suitable as electrical insulation.

6 Claims, No Drawings

METHOD FOR MANUFACTURING EXTRUSION MOLDED SILICONE INSULATING ARTICLES

BACKGROUND OF THE INVENTION

This invention relates to a method for manufacturing extrusion molded silicone insulating articles.

As is well known in the art, silicone rubbers are widely used in a variety of applications because of their improved heat resistance, low-temperature resistance, and electrical properties.

In particular, silicone rubbers are advantageously used in an extrusion molded form as electric conductor insulating coatings, insulating tubes, anode caps, and other articles which are required to have high electrical insulation. Depending on the intended application, the silicone rubber composition is often modified to increase the dielectric strength as by increasing the density, increasing the rate of vulcanization, increasing the degree of crosslinking, sufficiently deaerating, reducing the content of volatile matter, and reducing the content of electrical impurities.

However, such modifications can merely improve the dielectric strength of silicone rubbers to the range of about 20 to 30 kilovolts/mm on average, which range is not regarded as being satisfactory. With such a degree of electrical insulation, silicone rubber compositions must be extrusion molded to a substantial thickness when it is desired to use the extrusion molded compositions in such applications as conductor insulation. For this and other reasons, conventional silicone rubber compositions are inconveniently used to produce insulating articles capable of meeting the current requirements of compactness and light weight. Increased thickness requires vulcanizing conditions which includes vulcanizing rate and heat consumption which are disadvantageous for commercial manufacture.

SUMMARY OF THE INVENTION

A primary object of the present invention is to provide a new and improved method for manufacturing extrusion molded silicone insulating articles having increased dielectric strength per thickness and improved electrical insulation.

Another object of the present invention is to provide a method for manufacturing extrusion molded silicone insulating articles which are useful in electric conductor insulation.

A further object of the present invention is to provide a method for manufacturing extrusion molded silicone insulating articles which can be prepared, extrusion molded and cured through efficient procedures.

We have found that a silicone insulating article having increased dielectric strength per thickness and improved electrical insulation can be extrusion molded from a silicone rubber composition comprising 100 parts by weight of an organopolysiloxane having the average unit formula:

$$R_aSiO_{(4-a)/2} \qquad (1)$$

wherein R is a substituted or unsubstituted monovalent hydrocarbon radical having 1 to 10 carbon atoms, and a is a number having a value of from 1.95 to 2.05, about 5 to about 500 parts by weight of a finely divided silica filler, and an organic peroxide or another curing catalyst without losing the working parameters of roll milling, extrudability, and flow when a relatively small amount of high purity boron nitride powder is blended in the composition. The silicone rubber composition can be extrusion molded and vulcanized into an article which exhibits a dielectric strength of 40 kilovolts/mm or higher while maintaining excellent electrical insulation and physical properties.

According to the present invention, there is provided a method for manufacturing an extrusion molded silicone insulating article having improved electrical insulation, comprising the steps of:

extrusion molding a silicone rubber composition comprising (A) 100 parts by weight of an organopolysiloxane having the average unit formula:

$$R_aSiO_{(4-a)/2} \qquad (1)$$

wherein R is a substituted or unsubstituted monovalent hydrocarbon radical 1 to 10 carbon atoms, and a is a number having a value of from 1.95 to 2.05, (B) about 5 to about 500 parts by weight of a finely divided silica filler, (C) about 1 to about 50 parts by weight of powder boron nitride having a mean particle size of up to about 20 μm, and (D) a curing catalyst, and
curing the molded composition.

DETAILED DESCRIPTION OF THE INVENTION

Component (A) of the extrusion molding silicone rubber composition used in the method of the present invention is an organopolysiloxane having the average unit formula:

$$R_aSiO_{(4-a)/2} \qquad (1)$$

In formula (1), R is a substituted or unsubstituted monovalent hydrocarbon radical having 1 to 10 carbon atoms, preferably 1 to 6 carbon atoms. R radicals may be selected from alkyl radicals such as methyl, ethyl, propyl, and butyl, alkenyl radicals such as vinyl, allyl, and butenyl, aryl radicals such as phenyl and tolyl, and substituted ones of the foregoing radicals in which some or all of the hydrogen atoms attached to the carbon atoms of the radicals are substituted with halogen atoms, cyano and other groups, for example, chloromethyl, chloropropyl, 3,3,3-trifluoropropyl, and 2-cyanoethyl radicals. The radicals represented by R may be the same or different. Letter a is a positive number having a value of from 1.95 to 2.05. The preferred radicals represented by R are methyl, vinyl, phenyl, and 3,3,3-trifluoropropyl radicals. In the radicals represented by R, methyl radicals may be contained in an amount of 1 to 99.9 mol%, vinyl radicals may be contained in an amount of 0.1 to 10 mol%, phenyl radicals may be contained in an amount of 0 to 30 mol%, and 3,3,3-trifluoropropyl radicals may be contained in an amount of 0 to 99.9 mol%, based on the moles of R radicals. More preferably, R consists essentially of 90 to 99 mol% of methyl or 3,3,3-trifluoropropyl units, 1 to 5 mol% of vinyl units, and 1 to 10 mol% of phenyl units.

The organopolysiloxane preferably has a straight-chain molecular structure although partial inclusion of branchedchain structure in the molecule is acceptable. It is desired that the organopolysiloxane be end blocked with a triorganosilyl or hydroxyl radical. Examples of the triorganosilyl radical include trimethylsilyl, dimethylvinylsilyl, methylphenylvinylsilyl, methyldiphenylsilyl, methyldivinylsilyl, and trivinylsilyl radicals.

Preferred examples of component (A) are given below:

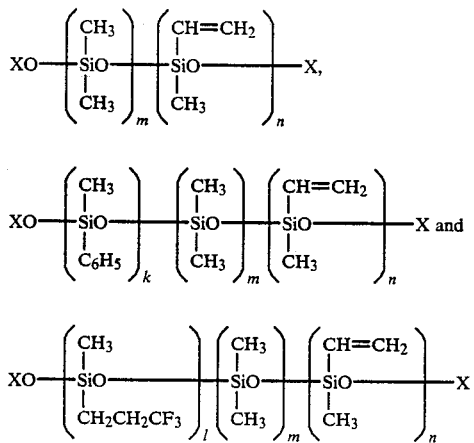

In the formula, X, k, l, m and n are as defined below. X is

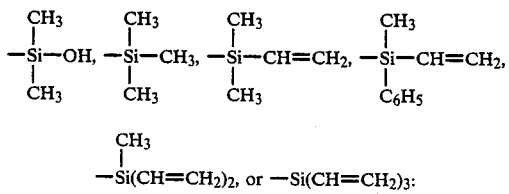

k is an integer of 100 to 3,000,
l is an integer of 100 to 10,000,
m is an integer of 0 to 10,000, and
n is an integer of 0 to 1,000.

The degree of polymerization of the organopolysiloxane is not critical to the present invention although it is usually in the range of about 100 to about 10,000, more preferably about 1,000 to about 10,000. The organopolysiloxane may have any desired degree of polymerization depending on the intended application of the composition. The viscosity of the organopolysiloxane is not particularly limited although it preferably has a viscosity of at least 300 centistokes (cs), preferably 300 to 10,000,000 cs at 5° C.

Component (B) of the composition is a filler in the form of finely divided silica. The filler is added for the purposes of reinforcement, extension, thickening, and processability improvement. For example, there may be added fumed silica, wet milled silica, fumed silica and wet milled silica whose surface has been rendered hydrophobic, finely divided quartz, diatomaceous earth, and mixtures thereof. It is preferred to use a silica filler having a specific surface area of at least 1 m2/g, preferably 1 to 500 m2/g as measured by BET method.

The finely divided silica filler is blended in an amount of about 5 to about 500 parts by weight, preferably about 10 to about 300 parts by weight per 100 parts by weight of organopolysiloxane (A). Less than about 5 parts by weight of the filler is ineffective for the reinforcing purpose whereas more than about 500 parts by weight of the filler markedly detracts from the extrusion molding properties of the composition including mold flow and discharge.

The composition has blended therein component (C) in the form of high purity boron nitride powder. The boron nitride powder may have a hexagonal, plate or another shape, but must have a mean particle size of up to about 20 μm, preferably from about 0.2 μm to about 15 μm, more preferably from about 0.4 μm to about 10 μm. The use of boron nitride powder having a mean particle size of more than about 20 μm not only markedly detracts from the extrusion molding properties of the composition, resulting in poor working properties, but also adversely affects the physical properties of the cured composition.

The boron nitride powder is added to the composition in an amount of about 1 to about 50 parts by weight, preferably about 2 to about 20 part by weight per 100 parts by weight of organopolysiloxane (A). Addition of more than about 50 parts by weight of boron nitride powder is uneconomical and detracts from the workability and physical properties of the composition. Less than 1 part by weight of boron nitride powder is too small to achieve the object of increasing dielectric strength.

The composition will have further improved electrical properties when high purity boron nitride powder is used. The term high purity means that the content of electrical impurities in the boron nitride powder is minimized, more particularly the contents of CaO and $B_2O_3$ are up to 0.04% and up to 0.1% by weight, respectively.

Component (D) blended in the composition is an organic peroxide or another curing catalyst. These curing catalysts are those commonly used in conventional silicone rubber compositions in order to promote heat curing.

Examples of the organic peroxide include benzoyl peroxide, monochlorobenzoyl peroxide, p-methylbenzyol chloride, 2,4-dichlorobenzoyl peroxide, t-butyl perbenzoate, dicumyl peroxide, 2,5-bis(t-butylperoxy)-2,5-dimethylhexane, 2,5-bis(t-butylperoxy)-2,5-dimethylhexine, dicarbonates such as dimyristyl peroxydicarbonate and dicyclododecyl peroxydicarbonate, t-butyl monoperoxycarbonates, and compounds having the formula:

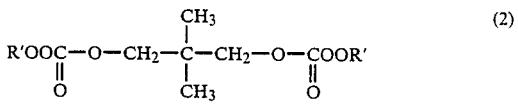

wherein R' is a monovalent hydrocarbon radical having 3 to about 10 carbon atoms.

The curing catalysts other than the foregoing organic peroxides are curing catalysts which are generally used to cure silicone rubber compositions, for example, platinum/SiH compound. These curing catalysts are to promote addition reaction.

The amount of component (D) or curing catalyst added may be properly chosen depending on the identity of the curing catalyst and the type and amount of the remaining components. Preferably, the curing catalyst is added in an amount of about 0.01 to about 5 parts by weight per 100 parts by weight of organopolysiloxane (A).

In addition to the essential components (A) through (D), the silicone rubber compositions may have blended therein other optional components. Such optional components are those additives commonly added to silicone rubber compositions, including dispersants, for example, low molecular weight siloxanes having a degree of polymerization of up to 100, silanol-containing silanes, and alkoxy-containing silanes; heat resistance modifiers such as iron oxide, cerium oxide, iron octylate, and titanium oxide; various pigments for coloring purposes; and flame retarding aids such as platinum and palladium compounds. These optional components may be added to the silicone rubber compositions of the present invention in their commonly used amounts.

In the practice of the present invention, the silicone rubber composition of the above-mentioned formulation may be extrusion molded and vulcanized into an insulating article which has a high dielectric strength and improved physical properties.

Extrusion molding and vulcanization of the silicone rubber composition may be carried out by any generally well-known extrusion and vulcanization methods. A choice may be made of the methods best suited for the intended application of the composition. For example, when an electric conductor is coated with the silicone rubber composition to form an insulated conductor, the vulcanization method may be selected from atmospheric hot-air vulcanization, continuous steam vulcanization, electron beam vulcanization, UHF (ultra-high frequency) vulcanization, and LCM (liquid curing medium) vulcanization. Vulcanizing conditions are not critical although vulcanization is preferably carried out at about 100° to 500° C. for about 1 second to 5 minutes.

With the use of the extrusion molding silicone rubber composition mentioned above which has blended therein a relatively small amount of boron nitride powder having a mean particle size of up to about 20 microns, extrusion molding is easy because of improved workability including roll processability, extrudability, and flow. The silicone rubber composition can be extrusion molded and cured into an insulating article which usually has a high dielectric strength of at least 40 kV/mm and excellent physical properties so that it is suitable for conductor insulation. Lightweight, thin, compact insulating parts can be manufactured from the composition in an efficient manner.

EXAMPLES

Examples of the present invention are given below by way of illustration and not by way of limitation.

Examples 1–3 and Comparative Examples 1–2

To 100 parts by weight of an organopolysiloxane blocked with a dimethylvinylsilyl radical at each end of the molecular chain, consisting of 99.75 mol% of $(CH_3)_2SiO$ unit and 0.25 mol% of $(CH_2=CH)(CH_3)_2SiO_{1/2}$ unit, and having a viscosity of 10,000,000 centistokes at 25° C. were added 40 parts by weight of fumed silica (Aerosil® 200, manufactured and sold by Nihon Aerosil K.K.) and 4 parts by weight of diphenylsilane diol dispersant. They were milled into a homogeneous mixture. The mixture was heat treated at 150° C. for 4 hours and then masticated and plasticized with a twin-roll mill, obtaining a base compound.

To the base compound were added high purity boron nitride having a mean particle size of 1.8 $\mu$m and containing less than 0.04% by weight of CaO and less than 0.1% by weight of $B_2O_3$ (KBN(h)-SPA, manufactured and sold by Shinetsu Chemical Industries K.K.) and bis-2,4-dichlorobenzoyl peroxide vulcanizing agent in the amounts reported in Table 1. The mixture was milled with a twin-roll mill, obtaining an extrusion molding silicone rubber composition.

Using an extruder with a barrel having a diameter of 40 mm, the silicone rubber composition was extrusion molded onto a core conductor in the form of a tin-plated soft copper wire having a diameter of 1 mm to form a silicone rubber coating having an outer diameter of 3 mm. After extrusion, the coating was kept in an atmospheric hot-air oven at 400° C. for a residence time of 15 minutes to effect atmospheric hotair vulcanization, obtaining a silicone rubber coated conductor.

The resulting silicone rubber coated conductor was measured for physical properties, and volume resistivity and breakdown strength under dry and wet conditions of the silicone rubber coating according to JIS C-2123. The results are shown in Table 1.

TABLE 1

| Composition, parts | Examples | | | | |
|---|---|---|---|---|---|
| by weight | E1 | E2 | E3 | CE1 | CE2 |
| Organopolysiloxane | 100 | 100 | 100 | 100 | 100 |
| Fumed silica | 40 | 40 | 40 | 40 | 40 |
| Diphenylsilane diol | 4 | 4 | 4 | 4 | 4 |
| Boron nitride (1.8 $\mu$m) | 5 | 10 | 20 | 0 | 60 |
| Bis-2,4-dichlorobenzoyl peroxide | 1.5 | 1.5 | 1.5 | 1.5 | 1.5 |
| Physical Properties | | | | | |
| Hardness (JIS K-6301) | 65 | 66 | 72 | 60 | UM |
| Tensile strength, kg-f/cm$^2$ | 102 | 93 | 90 | 98 | UM |
| Elongation, % | 270 | 225 | 215 | 255 | UM |
| Dry | | | | | |
| Volume resistivity, $\Omega$-cm | 3.4E15 | 3.4E16 | 2.2E16 | 1.0E16 | UM |
| Breakdown strength, kV/mm | 40 | 41 | 51 | 29 | UM |
| Wet | | | | | |
| Volume resistivity, $\Omega$-cm | 2.8E15 | 1.5E15 | 1.7E15 | 5.0E15 | UM |
| Breakdown strength, kV/mm | 42 | 40 | 43 | 30 | UM |

UM: Unmeasurable because the composition had poor roll processability and could not be extruded into a satisfactory sheet.

It is evident from Table 1 that conductor coatings of silicone rubbers containing boron nitride having a mean particle size of 1.8 $\mu$m according to the invention (E1, E2 and E3) have good physical properties and a high dielectric strength.

Examples 4–6 and Comparative Example 3

Silicone rubber-coated conductors were prepared by the same procedure as in Example 1 except that 20 parts by weight of boron nitride powder having a varying mean particle size as shown in Table 2 was added. The resulting silicone rubbers were measured for physical properties and dielectric strength.

The results are shown in Table 2.

TABLE 2

| | Examples | | | |
|---|---|---|---|---|
| Composition, parts by weight | E4 | E5 | E6 | CE3 |
| Organopolysiloxane | 100 | 100 | 100 | 100 |
| Fumed silica | 40 | 40 | 40 | 40 |
| Diphenylsilane diol | 4 | 4 | 4 | 4 |
| Boron nitride | | | | |
| mean particle size 0.58 $\mu$m | 20 | | | |
| mean particle size 1.8 $\mu$m | | 20 | | |
| mean particle size 12.0 $\mu$m | | | 20 | |
| mean particle size 30.0 $\mu$m | | | | 20 |
| Bis-2,4-dichlorobenzoyl peroxide | 1.5 | 1.5 | 1.5 | 1.5 |
| Physical Properties | | | | |
| Hardness (JIS K-6301) | 73 | 72 | 70 | UM |
| Tensile strength, kg-f/cm$^2$ | 89 | 90 | 66 | UM |
| Elongation, % | 180 | 215 | 185 | UM |
| Dry | | | | |
| Volume resistivity, $\Omega$-cm | 1.8E15 | 2.2E16 | 1.7E16 | UM |

TABLE 2-continued

| Composition, parts by weight | Examples | | | |
|---|---|---|---|---|
| | E4 | E5 | E6 | CE3 |
| Breakdown strength, kV/mm | 41 | 51 | 41 | UM |
| Wet | | | | |
| Volume resistivity, Ω-cm | 1.8E15 | 1.7E15 | 2.6E15 | UM |
| Breakdown strength, kV/mm | 41 | 43 | 40 | UM |

UM: Unmeasurable because the composition had poor roll processability and could not be extruded into a satisfactory sheet.

It is evident from Table 2 that the silicone rubber composition (CE3) having blended therein boron nitride powder having a mean particle size of more than 20 μm was inefficient to roll process and unextrudable. The silicone rubber compositions (E4-6) of the invention having blended therein boron nitride powder having a mean particle size of less than 20 μm were efficient to roll process and extrudable into articles having improved physical properties and a high dielectric strength.

While the invention has been described in its preferred embodiments, obviously modifications and variations are possible in light of the above teachings. It is therefore to be understood that within the scope of the appended claims, the invention may be practiced otherwise than as specifically described.

What is claimed is:

1. A method for manufacturing an extrusion molded silicone insulating article having improved electrical insulation, comprising the steps of:

extrusion molding a silicone rubber composition comprising (A) 100 parts by weight of an organopolysiloxane having an average unit formula:

$$R_aSiO_{(4-a)/2} \quad (1)$$

wherein R is at least one radical selected from the group consisting of unsubstituted monovalent hydrocarbon radicals and substituted monovalent radicals each having 1 to 10 carbon atoms, and a is a number having a value of from 1.95 to 2.05, (B) 5 to 500 parts by weight of a finely divided silica filler having a specific surface area of from 1 to 500 m²/g, (C) 2 to 20 parts by weight of powder boron nitride having a mean particle size of from 0.4 μm to 10 μm, and (D) 0.01 to 5 parts by weight of a curing catalyst, and curing the molded composition.

2. The method of claim 1 wherein the organopolysiloxane of (A) is selected from the group consisting of

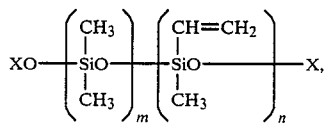

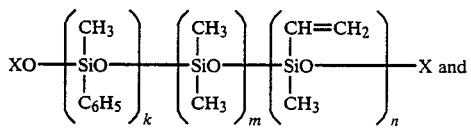

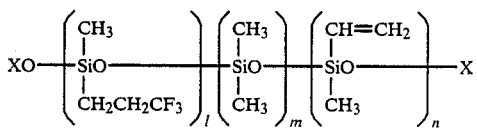

wherein
X is

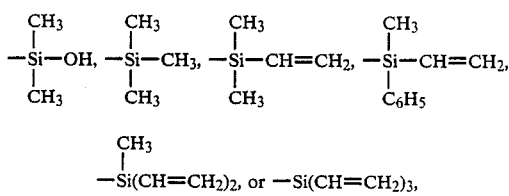

$-Si(CH=CH_2)_2$, or $-Si(CH=CH_2)_3$, k is an integer of 100 to 3,000,
l is an integer of 100 to 10,000,
m is an integer of 0 to 10,000, and
n is an integer of 0 to 1,000.

3. The method of claim 1 wherein the powder boron nitride is high purity boron nitride which contains up to 0.04% by weight of CaO and up to 0.1% by weight of $B_2O_3$.

4. The method of claim 1 wherein the curing catalyst is an organic peroxide.

5. The method of claim 1 wherein the radical R of formula (1) is comprised of 1 to 99.9 mol% of methyl radicals, 0.1 to 10 mol% of vinyl radicals, 0 to 30 mol% of phenyl radicals and 0 to 99.9 mol% of 3,3,3-trifluoropropyl radicals, based on the mole radicals of R.

6. The method of claim 1 wherein the radical R of formula (1) is selected from the group consisting of methyl, ethyl, propyl, butyl, vinyl, allyl, butenyl, phenyl, tolyl, chloromethyl, chloropropyl, 3,3,3-trifluoropropyl and 2-cyanoethyl.

* * * * *